Patented Sept. 13, 1938

2,129,934

UNITED STATES PATENT OFFICE 2,129,934

MANUFACTURE OF A NEW ANTHRAQUINONE VAT DYESTUFF

Francis Irving and Cecil Shaw, Grangemouth, Scotland, assignors to Imperial Chemical Industries Limited, a corporation of Great Britain No Drawing. Application November 5, 1935, Serial No. 48,441. In Great Britain November 7, 1934

2 Claims. (Cl. 260—303)

According to this invention we manufacture a new and valuable vat dyestuff having the general formula

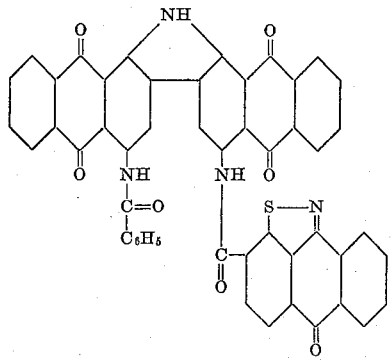

either by acylating the carbazole from 4-amino-4'-benzoylamino - 1:1' - dianthrimide with 1:9-anthrathiazole-2-carboxy chloride or by converting 4 - benzoylamino-4'-(1":9"-anthrathiazole-2"-carbamino)-1:1'-dianthrimide to its carbazole.

The acylation may be effected by heating the substances together in a solvent, preferably nitrobenzene. The conversion to the carbazole may be conveniently effected by treating with concentrated sulphuric acid at ordinary temperature, and then heating with sodium dichromate in acid.

The starting materials, which are also new, may be made by the processes described in the following examples.

This new vat dyestuff dissolves in concentrated sulphuric acid with a brown color, and dyes cotton from a brownish-red alkaline hydrosulphite vat in brown shades, which become olive-green in air, and have excellent fastness to chemick, washing, light and medium kier boiling.

The following examples in which parts are by weight illustrate, but do not limit the invention.

Example 1

15 parts of the carbazole from 4-amino-4'-benzoylamino-1:1'-dianthrimide, made as hereinafter described, are added to 350 parts of dry nitrobenzene and 18 parts of 1:9-anthrathiazole-2-carboxy chloride. The mixture is stirred and heated for 8 hours at 200–210° C. and then cooled and filtered. The substance remaining on the filter is steam distilled in presence of soda ash in order to remove nitrobenzene, and the product is filtered off, washed with hot water and dried. It dyes cotton as previously described in olive-green shades.

Example 2

The carbazole from 1-amino-4-benzoylamino-1:1'-dianthrimide may be made as follows.

1 part of the carbazole from 4:4'-dibenzoyldiamino- 1:1'-dianthrimide (Caledon Olive R, described in the Colour Index under No. 1150, but wrongly formulated there), is dissolved with stirring in 10 parts of 96% sulphuric acid, the solution is heated at 70° C. for 6 hours, cooled, poured into water, the precipitate filtered off, washed with water, extracted with dilute sodium carbonate solution to dissolve out benzoic acid, filtered and washed with water until neutral and dried. The resulting product is a black powder, which dissolves in concentrated sulphuric acid with a brown color and dyes cotton blue-grey shades from a brown vat. These dyeings however are not fast to chemick.

Example 3

15 parts of 1-benzoylamino-4'-(1":9"-anthrathiazole-2"-carbamino)-1:1'-dianthrimide, made as described in the following example are dissolved in 150 parts of 96–98% sulphuric acid and the solution stirred overnight at room temperature and then poured into 1500 parts of cold water. 18 parts of sodium dichromate are added to the suspension and this is heated to 90° C. during 1 hour and kept at 90° C. for 3 hours, during which the olive-green color of the dyestuff gradually develops. The suspension is filtered hot and the dyestuff washed with hot water and dried. It is the same as that of Example 1.

Example 4

1-benzoylamino-4'-(1":9"-anthrathiazole-2"-carbamino)-anthraquinone may be made as follows.

104 parts of 1-chloro-4-(1':9'-anthrathiazole-2'-carbamino)-anthraquinone, 80 parts of 1-amino-4-benzoylamino-anthraquinone, 120 parts of naphthalene, 3 parts of cuprous chloride and 9 parts of anhydrous sodium carbonate are boiled together for 24 hours. The mixture is partly cooled, 120 parts of xylene added and filtered at 80–100° C. The solid product is boiled with xylene and also boiled with mineral acid to remove impurities soluble in these and is then obtained as a black powder dissolving in concentrated sulphuric acid with a red-brown color. 1-chloro-4-(1':9'-anthrathiazole-2'-carbamino)-anthraquinone is obtained by acylating 1-chloro-4-aminoanthraquinone with 1:9-anthrathiazole-2-carboxy chloride in the manner described for similar preparations in British patent specification No. 326,487.

Having now particularly described and ascertained the nature of our said invention and in what manner the same is to be performed, we declare that what we claim is—

1. The compound of the following formula

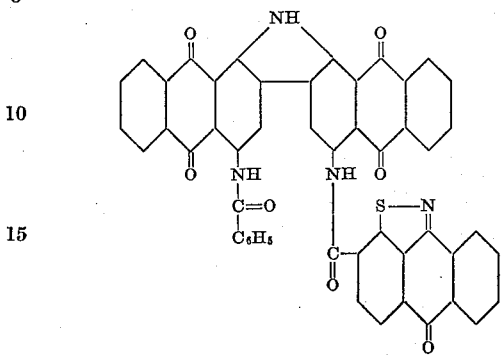

which dissolves in concentrated sulphuric acid with a brown color and dyes cotton from a brownish-red alkaline hydrosulphite vat in brown shades which become olive-green in air and have excellent fastness properties.

2. The process for the manufacture of the hereindescribed new vat dyestuff which comprises subjecting 4-4'-dibenzoyldiamino-1,1' anthrimide carbazole to the action of concentrated sulphuric acid until one benzoyl group has been removed, and acylating the resulting product by reacting the same with 1,9-anthrathiazole-2-carboxy chloride.

FRANCIS IRVING.
CECIL SHAW.